Oct. 9, 1945.     R. J. PARSONS     2,386,569
AIR-CONDITIONING
Filed Dec. 14, 1943
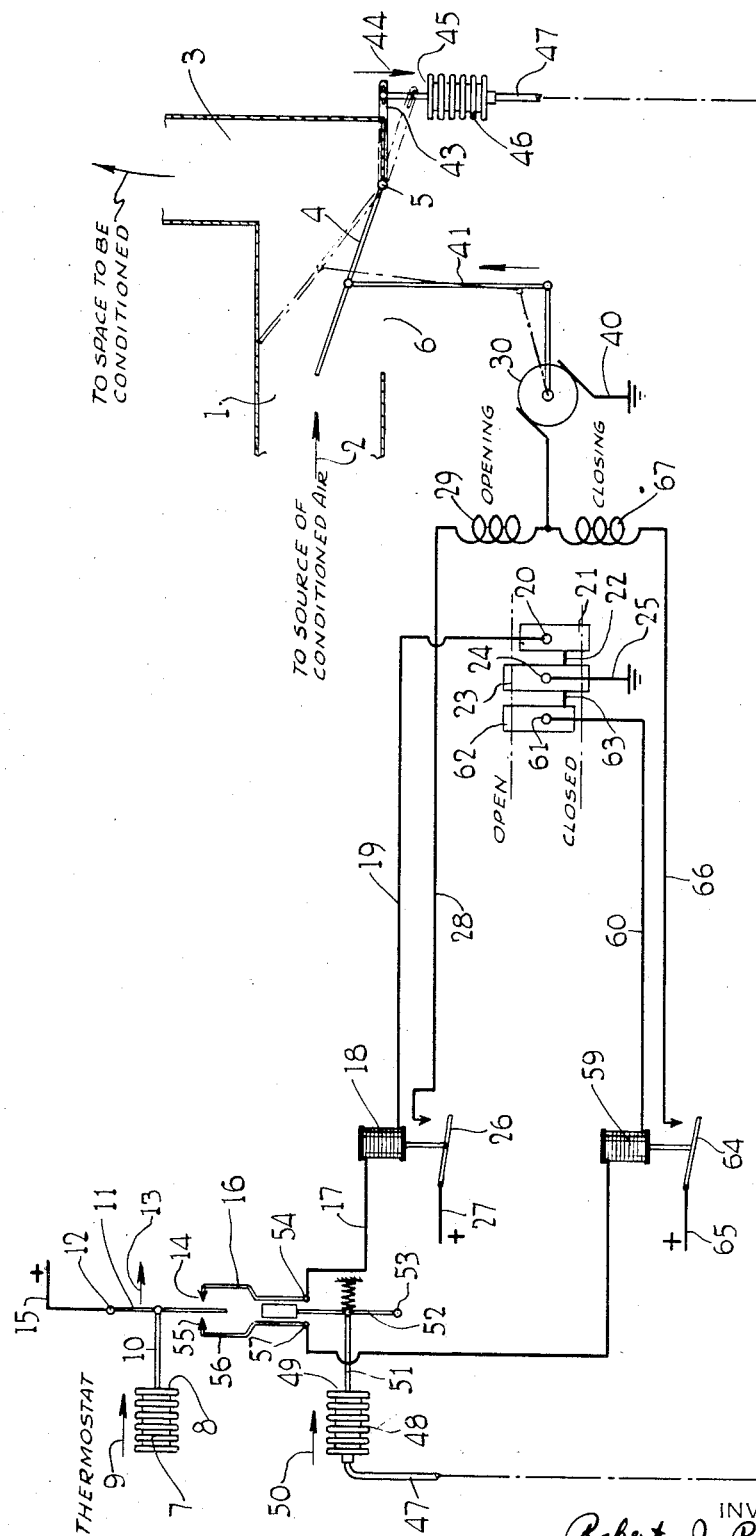
INVENTOR
Robert J. Parsons
BY
Lyman E. Dodge
ATTORNEY Patented Oct. 9, 1945

2,386,569

UNITED STATES PATENT OFFICE 2,386,569

AIR CONDITIONING

Robert J. Parsons, Schenectady, N. Y., assignor to Consolidated Car Heating Company, Inc., Albany, N. Y., a corporation of New York Application December 14, 1943, Serial No. 514,273

1 Claim. (Cl. 236—78)

This invention relates to heating and ventilating, particular the heating and ventilating of a vehicle, such as a bus or street car.

A principal object of this invention is the provision of a construction and arrangement whereby heated or conditioned air flowing in a conduit to a space to be heated and ventilated may be diverted to a by-pass, more or less, by a valve or damper which may be regulated minutely to a plurality of positions.

Other objects and advantages will appear as the description of the particular physical embodiment selected to illustrate the invention progresses and novel features will be particularly pointed out in the appended claims.

In describing the particular physical embodiment selected to illustrate the invention, reference will be had to the accompanying drawing, consisting of a single schematic or diagrammatic view, and to the characters of reference thereon.

In drawing, 1 designates a conduit or passage way connecting with a source of heated or conditioned air under more or less pressure sufficient to cause it to flow through a conduit in the direction of the arrow 2. The heated air is intended to flow through the other end 3 of the conduit into a space to be heated or conditioned.

If the space to be heated is at a temperature considerably lower than that desired, most if not all, of the heated air would, for a time, be directed to the space but if the space to be heated is only a slight degree lower in temperature than the temperature desired, then only a portion of the heated air should be flowed into the space to be heated. To meet this requirement, a damper or air valve or air flow controller 4 is provided. This damper is pivoted at the point 5. When this damper is closed, that is, when it closes the aperture or by-pass 6, all of the heated air will flow to the space to be heated. The damper 4, in accordance with my invention, pivoting on the pivot 5 may be moved more or less toward the full open position 6 directing more or less of the heated air to the space to be heated or entirely cutting off the heated air from the space to be heated as would occur when the damper is in the dotted line position as indicated in the figure, that is, the damper will variably obstruct the conduit.

In order to control the damper 4 to the position desired, a thermostat of any proper form, such as 7, is placed in the space to be heated so as to be affected by the temperature thereof. The particular form of thermostat shown is of the bellows type which, in general, is an expansible and compressible vessel or chamber. In the form shown, the end 8 upon an increasing temperature moves in the direction of the arrow 9 and upon a decreasing temperature moves in the opposite direction.

The diagram shows all circuits open and the damper 4 in a somewhat mid position. If now the temperature of the space to be heated should increase the end 8 of the thermostat moving in the direction of the arrow 9 by means of the link 10, would move pivoted contact member 11, pivoted at 12, in the direction of the arrow 13. This movement would bring pivoted member or arm 11 to such position that it would touch the contact point 14. A circuit would thus be formed which may be traced as follows: positive terminal of the source of an electro motive force, wire 15, contact on 11, contact point 14, pivoted arm 16, wire 17, relay coil 18, wire 19, contact knob 20, contact segment 21, wire 22, contact segment 23, contact knob 24 and wire 25 to the negative terminal of source of potential. Current flowing in the above traced path would energize the relay, including coil 18, and cause armature 26 to be lifted. When armature 26 has been lifted, a current will flow in the following path: positive terminal of the source of electro motive force, wire 27, relay armature 26, wire 28, opening field winding 29 of a motor, armature 30 and the negative terminal of the source by wire 40. Current flowing in the above traced path will cause the motor to revolve so as to move the link 41 in the direction of the arrow. This link is connected to the damper 4 and so will cause the movement of the damper 4 toward the full open position.

The movement of damper 4 toward the full open position will cause lever 43, which may be considered a prolongation of the damper 4 on the other side of the pivot 5, to press in the direction of the arrow 44 on end 45 of the closed vessel 46. The closed vessel 46 is of the bellows type, that is, the vessel is expansible and compressible. When lever 43 presses upon the end 45, the liquid, which is within the vessel 46 and completely fills it, is forced through the pipe or duct 47 to another vessel of the bellows type similar to vessel 46 and designated 48. The liquid forced into vessel 48 forces the end 49 in the direction of the arrow 50 and so forces link 51 in the same direction. The link 51 is attached to contact for breaking pivot arm 52 pivoted at 53. When arm 52 is moved in the direction of the arrow 50 it contacts arm 16 pivoted at 54 and moves that arm just out of contact with pivoted arm 11 thereby breaking the circuit through the relay 18 and so the circuit for the motor which operates the damper.

By suitable adjustments and precise manufacture the movement given to the damper 4 by the contacting of pivoted arm 11 with contact point 14 may be extremely small in that the circuit breaking pivot member 52 will break the control circuit upon a very slight movement of the damper 4. After the damper has been moved toward the open position by contact of pivoted arm 11 with point 14 and even after the circuit breaking pivoted member 52 has moved contact 14 away from pivoted arm 11, further rises in temperature will so affect thermostat 7 that pivoted arm 11 will again touch the contact point 14 and again cause the motor to operate to further open the damper but this further movement will be stopped after a very slight opening of the damper by the circuit breaking pivoted member 52 again forcing contact point 14 away from pivoted arm 11. Continued rise of temperature will eventually cause the damper to become fully open, that is, to assume the dotted line position as shown in the figure.

When the damper has assumed the full open position the contact knobs 20 and 24 will then be aligned on the line designated "open" on the diagram, being moved by the motor to that position, so that even if pivoted arm 11 is in contact with contact point 14 relay 18 will not be energized as knob 20 will be out of contact with segment 21.

If all parts are in the position as shown in the drawing and the temperature of the space to be heated in which thermostat 7 is contained should lower, then the pivoted arm 11 would be moved by the thermostat by means of link 10 in a direction opposite to that of arrow 13 and would touch contact point 55 so that a circuit would be formed in which current would flow as follows: positive terminal of the electromotive force, pivoted member 11, contact point 55, pivoted member 56 pivoted at 57, wire 58, relay coil 59, wire 60, contact knob or finger 61, contact segment 62, conductor 63, contact segment 23, contact knob 24 and wire 25 to the negative terminal of the source. Current flowing in the above traced path would raise the relay armature so that a circuit would be formed in which current would flow as follows: positive terminal of the source, wire 65, armature 64, wire 66, closing field coil of the motor 67, armature 39 and by wire 40 to the negative terminal of the source. Current flowing in the above traced path would energize the motor and cause it to move so that the damper by means of link 41 would be moved in a direction opposite to the arrow 42. Such movement of the damper 4 would enlarge the capacity of vessel 46 and the liquid in 48 due to the contractile force of the vessel 48 would flow into vessel 46 and link 51 would be drawn in a direction opposite to the arrow 50 causing circuit breaking pivoted arm 52 to contact pivoted arm 56 and move contact point 55 away from pivoted arm 11 thereby breaking the circuit of the motor by deenergizing the relay coil 59 so that the damper 4 would be given a very minute movement toward the closed position.

Just as the pivoted arm 11 could again touch contact point 14 after that point has been moved away from it by circuit breaking pivoted member 52, so contact arm 11 may again contact contact point 55 if a further lowering of temperature occurs in the space to be heated, and so a further movement of damper 4 toward the closed position.

When the damper 4 has been moved to the full closed position, the contact knob 61 would then be on the line designated "closed" in the diagram and so even if contact arm 11 touches contact 55 relay coil 59 will not be energized.

It will be observed that when the damper 4 is fully open contact knob 61 is in contact with segment 62 so that the system is in position and condition to move damper 4 toward the closed position. It should also be observed that when damper 4 is in a fully closed position knob 20 is in contact with segment 21 on the "closed" line so the system is in position and condition to operate the damper 4 toward the open position although in either the open or closed position the motor is not continuously energized after the damper has arrived in such position that it can no longer move in the same direction.

By suitable adjustments and adjustment of the sensivity of the thermostat 7, contact may be made between pivoted arm 11 and either of contact points 14 or 55 by a very slight difference in temperature and by suitably adjusting the sensivity of the closed hydraulic system including vessels 46 and 48 and pipe 47, a most minute movement of damper 4 may cause a movement of circuit breaking pivoted arm 52 in either of its directions in such wise that a very slight movement only of damper 4 will take place upon energization of the motor before the contact is broken at either 14 or 55. In short, the system provides for a very fine adjustment of the damper 4 to variably obstruct the duct in response to desired minute variations in temperature of the space to be heated affecting the thermostat 7.

It is to be understood the showing is schematic or diagrammatic and that in accordance with the best electrical practice I will suitably provide so that arcing at contacting points either in making or breaking will be minimized and that I will embody in my improvement structure in accordance with proven electrical practice that will provide for a minimum of damage and wear and tear by electrical arcs. For instance, I have shown contacts between arm 11 and 14 as made and broken by the mere movement of arm 11 to or away from each of the contacts but this is merely illustrative of the circuit involved and does not by any means indicate that I will exclude the use of micro-switches to be operated in one direction by pivoted arm 11 and to be operated in a contrary direction by pivoted arm 52.

Although I have particularly described one particular physical embodiment of the idea of means underlying my invention and explained the principle and construction thereof, nevertheless, I desire to have it understood that the form selected is merely illustrative but does not exhaust the possible physical embodiments of the idea of means underlying my invention.

What I claim as new and desire to secure by Letters Patent of the United States is:

A heating and ventilating system, including in combination: a duct adapted to communicate with a source of heated air at one point and with a space to be heated at another and provided intermediate thereof with an exit for heated air; a movable damper adapted to open and close said exit and to free and obstruct said duct; an electric motor connected to said damper for opening and closing said damper, said motor provided with an armature and with an opening field winding and a closing field winding whereby the armature may be rotated either for opening or closing the damper; a thermostat controlled by the temperature of the space to be heated including a member movable a predetermined amount in a first direction on an increase of temperature and a predetermined amount in an opposite second direction upon a decrease of temperature; an opening pivoted member and a closing pivoted member between which the said movable member is positioned whereby when the movable member moves in one direction it contacts the opening pivoted member and when moved in the opposite direction it contacts the closing pivoted member; an hydraulic motor adapted to operate a member in opposite directions; a member connected to said hydraulic motor and positioned intermediate said pivoted opening and closing members and adapted when moved against either to move it; a second hydraulic motor; connections between said second hydraulic motor and said damper whereby when the damper moves toward opening position compression takes place in said second hydraulic motor and when said damper moves to closed position expansion takes place in said hydraulic motor; a duct connecting the hydraulic motors; an opening relay and a closing relay each including an armature adapted to close a circuit when the relay is energized; a circuit controller connected to and operating in synchronism with the electric motor; a source of potential; a normal open conducting path including the opening field of the electric motor and the armature of the opening relay; a second normal open conducting path including the closing field of the electric motor and the armature of the closing relay, each said paths including the source of potential whereby when either is closed the electric motor operates accordingly; a third normally open conducting path including the opening relay the movable member attached to the thermostat the opening pivoted member, the circuit controller, and the source o potential; a fourth normally open conducting path including the closing relay the movable member attached to the thermostat, the closing pivoted member, the circuit controller and the source of potential whereby upon a change in temperature in the space to be heated the damper will be moved toward either open or closed position a predetermined amount and then the controlling circuit will be broken but be in condition to be again closed until fully open or fully closed position is reached whereupon the motor circuit for continuing motion in the same direction as that last caused will be opened but the circuit for moving the damper in the opposite direction will be in condition to be closed.

ROBERT J. PARSONS.